Aug. 3, 1965  H. J. FOX  3,197,874
MARKING GAUGE
Filed July 24, 1963
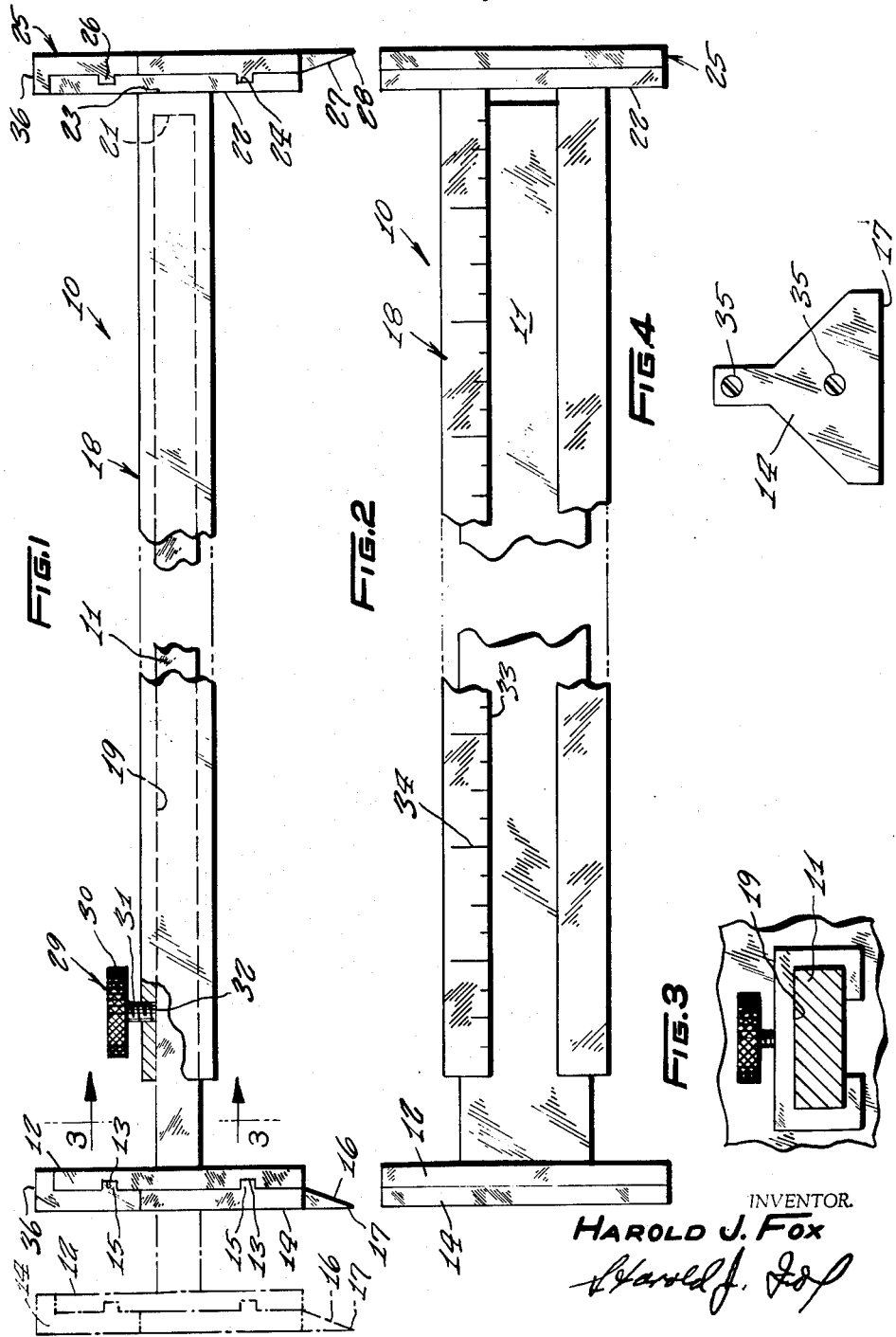
INVENTOR.
HAROLD J. FOX

United States Patent Office 3,197,874
Patented Aug. 3, 1965

3,197,874
MARKING GAUGE
Harold J. Fox, 3311 Wood Lane, Bakersfield, Calif.
Filed July 24, 1963, Ser. No. 297,381
3 Claims. (Cl. 33—158)

This invention relates generally to carpentry measuring tools.

One object of the present invention is to provide an adjustable slide gauge having a plurality of marking heads and which is used for the purpose of setting jambs and also for marking out rafter patterns.

Another object of the present invention is to provide an adjustable slide gauge having various marking heads for widths and having an adjustment nut and measuring scale for length.

Still another object of the present invention is to provide an adjustable slide gauge designed to mark precision widths and lengths in the field of carpentry and which eliminates the use of a square, pencil and tape measure.

A still further object of the present invention is to provide an adjustable slide gauge which will accordingly save considerable time, labor and cost in marking openings for setting jambs.

Other objects of the invention are to provide an adjustable slide gauge bearing the above objects in mind which is of simple construction, has a minimum number of parts, is inexpensive to manufacture and efficient in operation and use.

For other objects and for a better understanding of the invention, reference may be had to the following detailed description taken in conjunction with the accompanying drawing, in which:

FIGURE 1 is a fragmentary side elevational view of the device;

FIG. 2 is a bottom plan view thereof;

FIG. 3 is a transverse cross sectional view taken along the lines 3—3 of FIG. 1; and FIG. 4 is an end elevational view thereof.

Referring now to the drawing in detail, the numeral 10 represents a marking gauge according to the present invention wherein there is a slide bar 11 of longitudinal character and rectangular cross section the slide bar having an end plate 12 secured to one end thereof, as shown in FIG. 1 of the drawing. A plurality of keyways 13 are provided in the end plate and a marking head 14 having a plurality of corresponding keys 15 affixed to the end plate with the keys in engagement with the keyways. The marker head is provided with an anvil 16 having a chisel-shaped edge forming a marker line 17. A sleeve element 18 of generally longitudinal character and rectangular cross section is provided with a longitudinal groove 19 within which slide bar 11 is adjustably movable; as shown in FIG. 1, the opening 19 extends to the end 20, and the other end of the opening terminates within the body of the sleeve, as shown at 21. A plate 22 is rigidly affixed to the end 23 of the sleeve, the plate having a plurality of keyways 24 and a marking head 25, having a plurality of keys 26 is affixed to the plate by means of the keys being in engagement with the keyways 24. The marking head is provided with an anvil 27 having an edge serving as a marker line 28. An adjustment nut 29 having knurled head 30 and threaded shank 31 is threadedly engaged in opening 32 of the sleeve, the terminal end of the shank being in position for abutment with one side of the slide bar 11. The sleeve is provided with a longitudinal slot 33, extending throughout the length of the sleeve, for purpose of accessability to the slide bar. Thus, the sleeve can be readily formed from a length of channel material. One edge 33 of the slot has a scale 34 indicated thereupon which indicates linear inches and parts of inches in a conventional manner.

As shown in FIG. 4 of the drawing the marking heads may be secured to the end plates by means of screws 35.

In operative use, a marking head is selected from a plurality of interchangeable marking heads and is attached to the keyways of the end plate at each end of the device. The sleeve is moved adjustably relative to the slide bar and is set in position by means of the adjustment nut. The marker line is placed adjacent the surface to be marked and a hammer is tapped against the hammer head edge 36 on each marking head.

Thus, there has been provided a relatively simple tool designed to mark precision widths and lengths in carpentry and which is adaptable for marking openings for setting door jambs.

While various changes may be made in the detail construction, it shall be understood that such changes shall be within the spirit and scope of the present invention as defined by the appended claims.

Having thus described my invention, what I claim is:

1. In a marking gauge the combination of a longitudinally extending slide bar element and a longitudinally extending sleeve element, said sleeve element being in slidable engagement with said slide bar element, a pair of marking heads, means at one end of said slide bar for engaging one of said marking heads, means at one end of said sleeve for engagement with the other of said marking heads, means for securing said slide bar relative to said sleeve is a selected relative position, said means for securing the first said marking head comprising a plate secured to one end of said slide bar, said plate forming an end plate, said end plate having a plurality of keyways for engagement with said first marking head, said means for mounting the second said marking head on said sleeve comprising an end plate affixed securely to one end of said sleeve, said end plate having a plurality of keyways for engagement with the second of said marking heads, said marking heads comprising elements having a plurality of keys, said keys being engageable with said keyways of said end plates, screw fastening means extending through said marking heads for securement to said end plates, one edge of said marking head having an anvil, said anvil having a linear edge extending in a transverse direction marking a marker line, the opposite edge of said marking head forming a hammer head for receiving the blow of a hammer thereupon to impress said marker line upon an object to be marked, and said hammer heads extending upwardly beyond all the other elements comprising the marking gauge.

2. In a marking gauge the combination as set forth in claim 1, wherein said sleeve is of channel-shaped configuration having a longitudinal slot on one side, one edge of said slot having a linear scale marked thereupon and said linear scale having a designation of inches and parts of inches.

3. In a marking gauge the combination as set forth in claim 2 wherein said means for securing said slide bar to said sleeve comprises an adjustable nut, said nut being threaded in said sleeve and the threaded end of said adjustment nut being in position for abutment with one side of said slide bar.

References Cited by the Examiner

UNITED STATES PATENTS

| 1,192,418 | 7/16 | Hallberg | 33—194 |
| 1,424,492 | 8/22 | Leschen | 33—143 |
| 1,610,193 | 12/26 | Battle | 33—143 X |
| 2,223,342 | 12/40 | Fehse | 83—698 X |
| 2,440,973 | 5/48 | Podolan | 33—159 |
| 2,603,880 | 7/52 | Dunn | 33—143 |
| 2,698,636 | 1/55 | Schlage | 33—197 X |

FOREIGN PATENTS

| 99,501 | 7/40 | Sweden. |
| 169,034 | 10/59 | Sweden. |

ISAAC LISANN, *Primary Examiner*.